US008590879B2

(12) United States Patent
Eastwood

(10) Patent No.: US 8,590,879 B2

(45) Date of Patent: Nov. 26, 2013

(54) WORK TABLE FOR LIFT EQUIPMENT

(76) Inventor: Randall G. Eastwood, Millstadt, IL (US)

(*) Notice: Subject to any disclaimer, the term of this patent is extended or adjusted under 35 U.S.C. 154(b) by 50 days.

(21) Appl. No.: 13/416,658

(22) Filed: Mar. 9, 2012

(65) Prior Publication Data

US 2013/0234383 A1 Sep. 12, 2013

(51) Int. Cl.

| | |
|---|---|
| ***B23Q 3/00*** | (2006.01) |
| ***B60R 7/00*** | (2006.01) |
| *B25H 1/04* | (2006.01) |

(52) U.S. Cl.

USPC .......................................... 269/309; 224/403

(58) Field of Classification Search

USPC .................................. 269/309; 224/403, 499

See application file for complete search history.

(56) References Cited

U.S. PATENT DOCUMENTS

| | | | |
|---|---|---|---|
| 1,980,848 A * | 11/1934 | Cass | 378/174 |
| 3,269,621 A * | 8/1966 | Dishart | 224/585 |
| 3,648,305 A * | 3/1972 | Ersek | 378/180 |
| 3,741,200 A * | 6/1973 | Morin | 606/244 |
| 3,779,540 A * | 12/1973 | Boudreau | 5/655 |
| 3,942,781 A * | 3/1976 | Gerber | 269/289 R |
| 4,067,565 A * | 1/1978 | Daniels | 5/601 |
| 4,125,192 A * | 11/1978 | Dayen | 211/14 |
| 4,168,793 A * | 9/1979 | Knight | 224/162 |
| 4,522,381 A * | 6/1985 | Ludwick | 5/621 |
| 4,712,258 A * | 12/1987 | Eves | 5/424 |
| 4,739,526 A * | 4/1988 | Hollick | 5/83.1 |
| 4,863,024 A * | 9/1989 | Booth | 206/386 |
| 5,358,226 A * | 10/1994 | Arikita | 269/21 |
| 5,442,821 A * | 8/1995 | Weeks | 5/89.1 |
| 5,505,141 A * | 4/1996 | Barber | 108/57.26 |
| D382,395 S * | 8/1997 | Korshamn | D3/213 |
| 6,163,902 A * | 12/2000 | Mollette et al. | 5/601 |
| 6,244,538 B1 * | 6/2001 | Howard et al. | 244/17.17 |
| 6,386,560 B2 * | 5/2002 | Calender | 280/47.34 |
| 6,453,827 B1 * | 9/2002 | Perazzo | 108/51.3 |
| 6,493,890 B2 * | 12/2002 | Smeed | 5/503.1 |
| 6,659,319 B2 * | 12/2003 | Purpura | 224/576 |
| 6,796,473 B2 * | 9/2004 | Purpura | 224/576 |
| 6,971,132 B2 * | 12/2005 | Feinsod | 5/703 |
| 7,032,261 B2 * | 4/2006 | Heimbrock | 5/81.1 HS |
| 7,523,955 B2 * | 4/2009 | Blair | 280/656 |
| D610,491 S * | 2/2010 | Singleton et al. | D12/128 |
| 7,731,069 B2 * | 6/2010 | Lopreiato | 224/157 |
| 7,735,171 B2 * | 6/2010 | Kan | 5/732 |
| 7,810,645 B2 * | 10/2010 | Huang et al. | 206/710 |
| 8,091,895 B2 * | 1/2012 | Allen | 273/407 |
| 8,157,093 B2 * | 4/2012 | Ishikawa et al. | 206/386 |
| 8,341,778 B2 * | 1/2013 | Heimbrock | 5/600 |
| 8,382,086 B2 * | 2/2013 | Bresette | 269/289 R |
| 2001/0054806 A1 * | 12/2001 | Calender | 280/47.34 |
| 2003/0038149 A1 * | 2/2003 | Purpura | 224/275 |

(Continued)

*Primary Examiner* — Alvin Grant

(74) *Attorney, Agent, or Firm* — Maier & Maier, PLLC

(57) ABSTRACT

A work table. The work table can include a horizontal support panel having an upper surface and a lower surface, a raised edge projecting upwardly from the upper surface of the support panel and disposed substantially at the perimeter thereof, a pair of outer beams projecting downwardly from the lower surface of the support panel, each outer beam having a plurality of slits defined therein, a central beam projecting downwardly from the lower surface of the support panel, the central beam having a plurality of slits defined therein, and a plurality of fastening straps, each fastening strap receivable within a slit of the plurality of slits, the fastening straps adapted to couple the work table to a railing of an aerial lift.

7 Claims, 4 Drawing Sheets

(56) References Cited

U.S. PATENT DOCUMENTS

| | | | | |
|---|---|---|---|---|
| 2004/0094591 | A1* | 5/2004 | Purpura | 224/576 |
| 2006/0017299 | A1* | 1/2006 | Halvorsen | 294/152 |
| 2007/0062419 | A1* | 3/2007 | Stevens | 108/51.11 |
| 2007/0257586 | A1 | 11/2007 | Gonzalez | |
| 2008/0258435 | A1* | 10/2008 | Blair | 280/639 |
| 2008/0292397 | A1* | 11/2008 | Farney et al. | 404/32 |
| 2011/0074112 | A1* | 3/2011 | Allen | 273/407 |
| 2013/0062897 | A1* | 3/2013 | Olivier | 294/68.1 |

* cited by examiner

WORK TABLE FOR LIFT EQUIPMENT

BACKGROUND

Aerial lifts, such as scissor lifts, boom lifts, and articulating lifts are frequently used to allow workers to access elevated locations and other difficult to reach areas. Typically, such lifts include a platform where a worker can stand, and the platform is lifted to the location where work is to be performed. The platform is typically enclosed by a plurality of railings for safety purposes, and such railings include horizontal structural members.

Depending on the work to be performed, a worker may require diverse tools, hardware, equipment, and other supplies while on the platform. However, aerial lift platforms do not provide convenient storage for such supplies. Therefore workers typically place some necessary supplies on the floor of the platform. This requires the worker to bend down repeatedly to access the supplies, and furthermore presents a safety hazard. Furthermore, since space on the platform floor is limited, the worker may need to lower the platform to retrieve additional supplies. This consumes time and may require additional personnel to provide the platform worker with the necessary supplies. Therefore, a work area where the worker can safely and conveniently place tools, hardware, equipment, and other supplies is desired.

SUMMARY

According to at least one exemplary embodiment, a work table for lift equipment may be disclosed. The work table can include a horizontal support panel having an upper surface and a lower surface, a raised edge projecting upwardly from the upper surface of the support panel and disposed substantially at the perimeter thereof, a pair of outer beams projecting downwardly from the lower surface of the support panel, each outer beam having a plurality of slits defined therein, a central beam projecting downwardly from the lower surface of the support panel, the central beam having a plurality of slits defined therein, and a plurality of fastening straps, each fastening strap receivable within a slit of the plurality of slits, the fastening straps adapted to couple the work table to a railing of an aerial lift.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Referring generally to FIGS. 1-4 and according to at least one exemplary embodiment, a work table for lift equipment 100 may be disclosed. Work table 100 may be adapted to couple to at least two structural members. For example, such structural members may include the railing of an aerial lift (e.g. a scissor lift, boom lift, articulating lift, and so forth). Alternatively, work table 100 may be coupled to any desired horizontally-oriented structural member. Work table 100 may be constructed from any desired material, for example a lightweight plastic material, wood, metal, and so forth. Work table 100 may further be easily portable. Work table 100 can thus provide a convenient horizontal surface in any desired location, and may be used to support articles such as tools, hardware or other supplies or equipment at a height that is convenient for a worker, thereby reducing the necessity of the user to bend down or to leave the work area in order to get desired articles.

Figure 1:
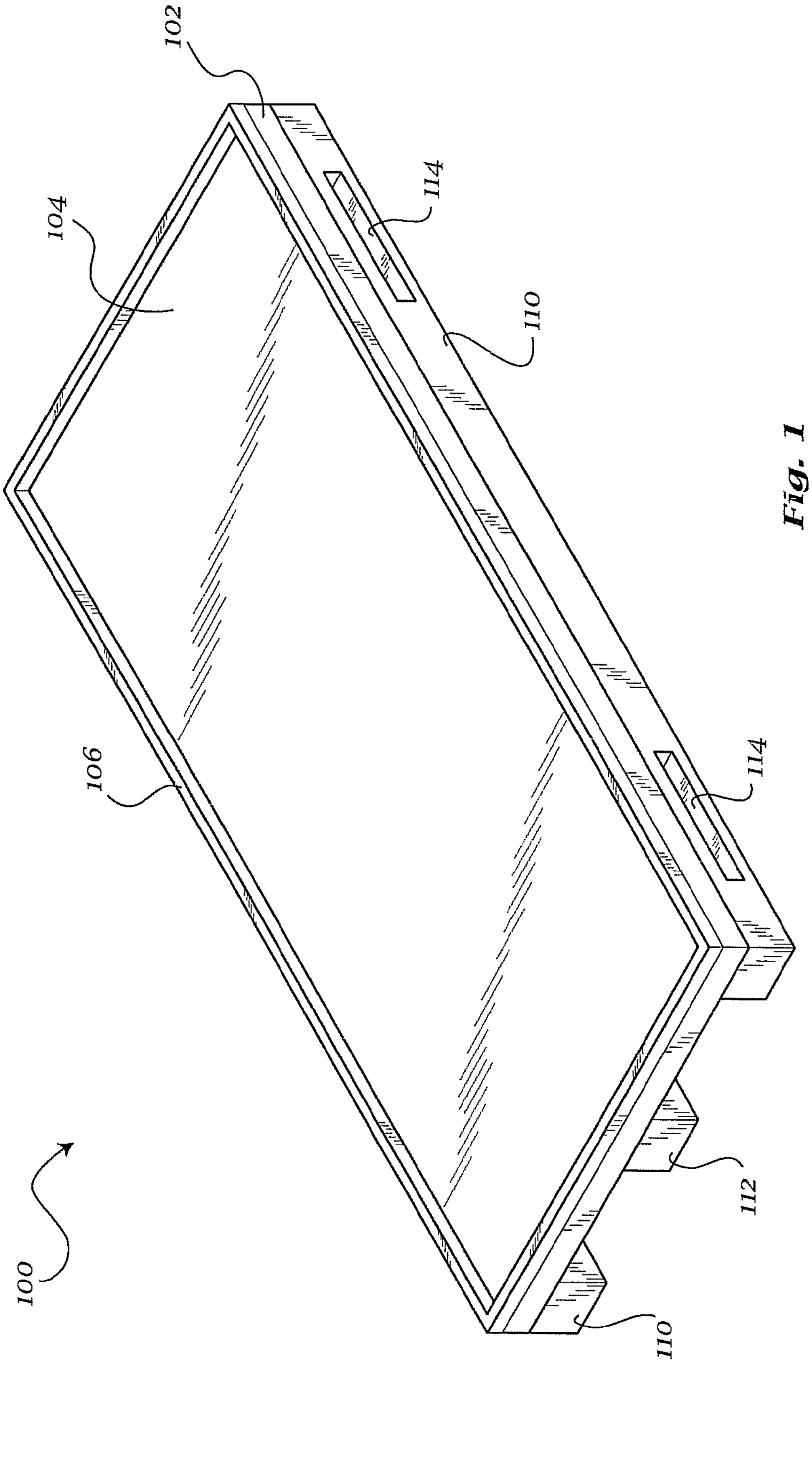
FIG. 1 is a top isometric view of an exemplary embodiment of a work table for lift equipment.

Turning to FIG. 1, work table 100 may include a horizontal support panel 102. Support panel 102 may be substantially planar, and have any desired shape and dimensions, for example a substantially rectangular shape. The upper surface 104 of support panel 102 may include a raised edge 106 around the perimeter of upper surface 104 and extending upward therefrom. Raised edge 106 can facilitate maintaining articles that are placed on top surface 104 within the perimeters of support panel 102. Raised edge 106 may be formed integrally with support panel 102, or may be coupled to support panel 102 by any desired coupling, adhesive, or fastener.

Figure 2:
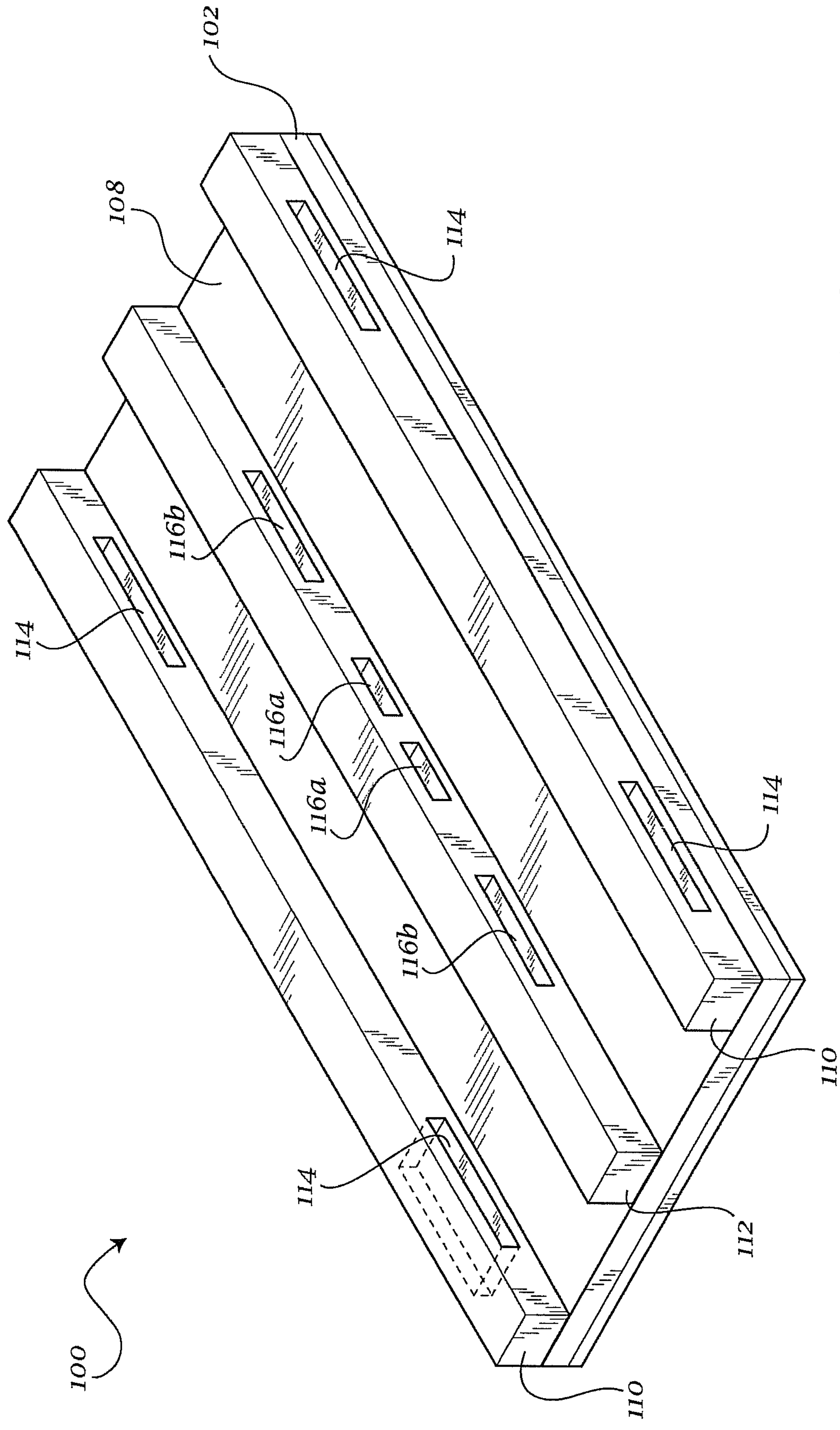
FIG. 2 is a bottom isometric view of an exemplary embodiment of a work table for lift equipment.

FIG. 2 shows a bottom view of work table 100. Disposed at the bottom surface 108 of support panel 102 may be a pair of outer beams 110 and a central beam 112. In some exemplary embodiments, outer beams 110 and central beam 112 may be oriented substantially parallel to each other. Furthermore, in some exemplary embodiments, outer beams 110 and central beam 112 may be oriented parallel to the major axis of support panel 102. For example, in the illustrated embodiment, support panel 102 may be substantially rectangular, and beams 110, 112 may be oriented parallel to the longitudinal axis of the support panel. Beams 110, 112 may be formed integrally with support panel 102, or may be coupled to support panel 102 by any desired coupling, adhesive, or fastener.

Each outer beam 110 can include a plurality of slots 114 extending therethrough. Slots 114 may be disposed at desired locations along the length of outer beam 110. In some exemplary embodiments, outer beam 110 may include a pair of slots 114, with each slot 114 disposed proximate an end of outer beam 110.

The central beam 112 can include a plurality of slots 116 extending therethrough. Slots 116 may be disposed at desired locations along the length of central beam 112. In some exemplary embodiments, central beam 112 may include two pairs of slots 116. For example, in the illustrated embodiment, a first pair of slots 116*a* may be disposed proximate the midpoint of central beam 112, and a second pair of slots 116*b* may be disposed peripherally in relation to first pair of slots 116*a*.

Figure 3B:
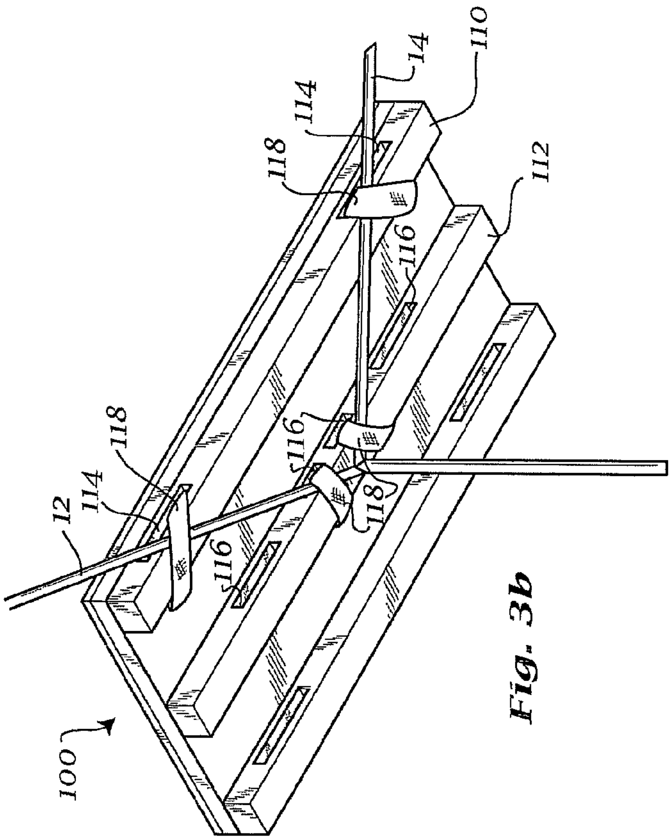
FIGS. 3*a*-3*b* are bottom isometric view of an exemplary embodiment of a work table for lift equipment coupled to horizontal structural members.
Figure 3A:
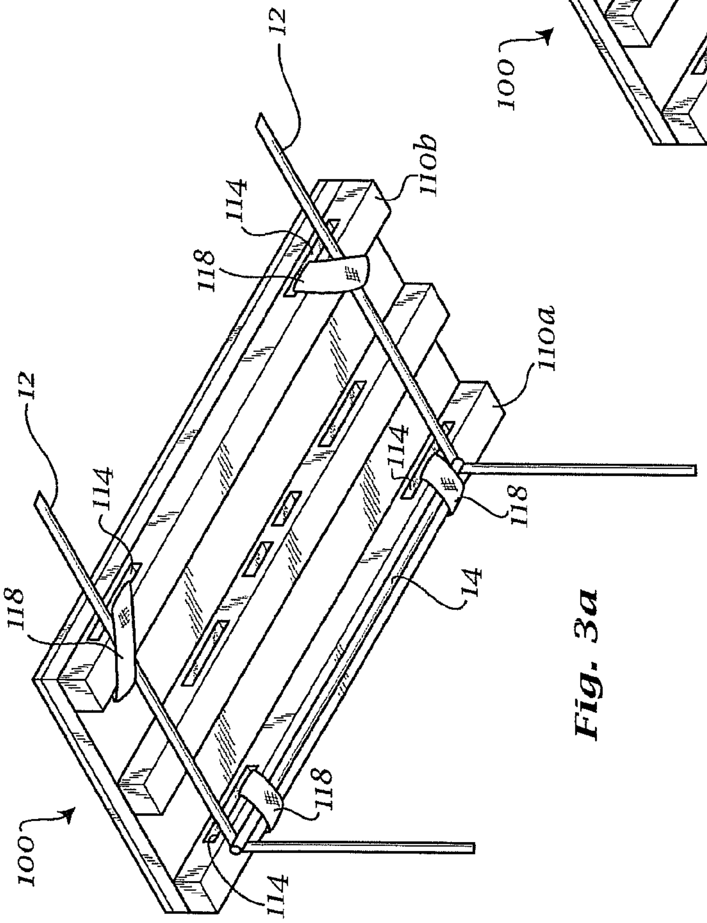

Turning to FIGS. 3*a*-3*b*, work table 100 may include a plurality of fastening straps 118. Fastening straps 118 may be used to couple work table 100 to a structural member, for example the railing of an aerial lift. Fastening straps 118 may include any known structure that facilitates securing straps 118 in a substantially tightened configuration, for example buckles, hook-and-loop fasteners, and so forth. Alternatively, any other known fastening structures that enable work table 100 to function as described herein may be contemplated and provided.

FIG. 3*a* illustrates an exemplary embodiment of work table 100 coupled to a railing of an aerial lift basket. Work table 100 may be coupled such that beams 110, 112 are oriented perpendicularly to the side railing 12*s* of the aerial lift basket, and parallel to the end railing 14 of the lift basket. In this configuration, straps 118 may be inserted through slots 114 of a first outer beam 110*a* and then wrapped around end railing 14 so as to couple first outer beam 110*a* to end railing 14. Similarly, additional straps 118 may be inserted through slots 114 of a second outer beam 110*b* and then wrapped around side railings 12 so as to couple second outer beam 110*b* to side railings 12.

FIG. 3*b* illustrates an exemplary embodiment of work table 100 coupled to a railing of an aerial lift basket. Work table 100 may be coupled such that beams 110, 112 are oriented diagonally to the side railings 12 and end railing 14 of the aerial lift basket. In this configuration, straps 118 may be inserted through slots 114 of a first outer beam 110*a* and then wrapped around end railing 14 and a side railing 12 so as to couple first outer beam 110*a* to railings 12, 14. Similarly, additional straps 118 may be inserted through slots 116 of central beam 112 and then wrapped end railing 14 and a side railing 12 so as to couple central beam 112 to railings 12, 14.

It should be appreciated that any desired number of slots 114 may be provided in outer beams 110, and, similarly, any desired number of slots 116 may be provided in central beam 112. Furthermore, it should be appreciated that work table 100 may be provided in any desired shape and dimensions. Coupling work table 100 to a desired structural member can generally involve placing a beam 110 or 112 on the desired structural member such that a portion of the structural member is proximate to a slot 114 or 116. A strap 118 can then be inserted through the particular slot 114 or 116 and wrapped around the proximate portion of the desired structural member. This can be repeated as desired with additional beams, slots and structural members, so as to achieve a stable coupling of work table 100 to the desired structural members.

Figure 4:
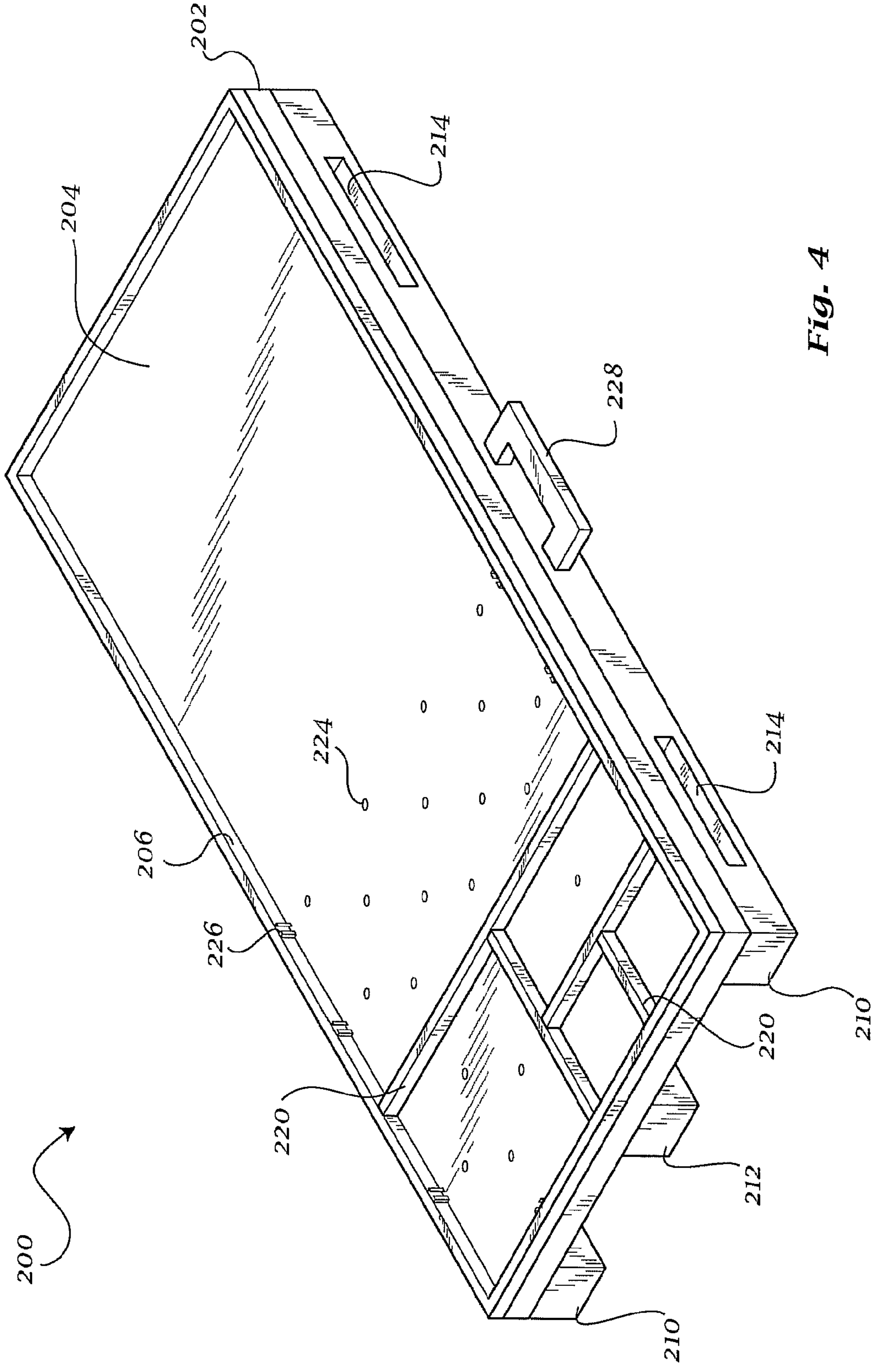
FIG. 4 is a bottom isometric view of another exemplary embodiment of a work table for lift equipment.

FIG. 4 shows another exemplary embodiment of a work table for lift equipment 200. Work table 200 should be understood to have substantially the same structure and elements as the embodiment of work table 100, with the addition of the below-described elements. Elements of work table 200 that are substantially similar to elements of work table 100 are indicated by similar numerals, but having the numeral prefix of two-hundred.

The exemplary embodiment of table 200 may include a plurality of separator bars 220. Separator bars 220 may be provided in a variety of lengths and may be adapted to couple to the top surface 204 of support panel 202. When coupled to support panel 202, separator bars 220, in conjunction with raised edge 206, can define a plurality of compartments 222 at top surface 204. Compartments 222 may be utilized by the worker to separate desired articles so as to aid with organization and reduce the likelihood of undesired intermingling of the articles.

Separator bars 220 may be removably coupled to top surface 204 by any desired coupling structures. For example, apertures 224 may be provided on top surface 204, and can receive dowels that may be provided on separator bars 220. As another example, channels 226 may be provided on raised edge 206 and on separator bars 220, and can engage the ends of separator bars 220. As another example, top surface 204 may be provided with a felt covering which can couple to hooked fasteners provided on separator bars 220. Alternatively, any known coupling that enables work table 200 to function as described herein can be contemplated and provided.

Work table 200 can further include a handle 228 to facilitate portability of work table 200. Handle 228 may be formed integrally with work table 228, may be coupled thereto by any desired coupling, adhesive, or fastener, or may be a retractable handle.

The embodiments of the work table disclosed therein can thus provide an easily portable and durable surface for a worker to place tools, hardware, and any other desired equipment and supplies. The work table can be disposed at a convenient height, thereby reducing the need of the worker to bend down to access desired supplies, or to lower the platform to access these supplies. Furthermore, the work table can be easily coupled and decoupled to any desired structural member, providing easy portability to any desired location. The plurality of slots provided at multiple locations along the lengths of the beams of the work table can further allow the work table to be coupled to lift platforms of various sizes, and at various orientations in relation to the lift platform.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A work table, comprising:
- a horizontal support panel having an upper surface and a lower surface;
- a raised edge projecting upwardly from the upper surface of the support panel and disposed substantially at the perimeter thereof;
- a pair of outer beams projecting downwardly from the lower surface of the support panel, each outer beam having a plurality of slits defined therein;
- a central beam projecting downwardly from the lower surface of the support panel, the central beam having a plurality of slits defined therein;
- a plurality of fastening straps, each fastening strap receivable within a slit of the plurality of slits, the fastening straps adapted to couple the work table to a railing of an aerial lift; and
- a carrying handle.

2. The work table of claim 1, wherein the pair of outer beams and the central beam are parallel to each other.

3. The work table of claim 1, wherein the pair of outer beams and the central beam are parallel to the major axis of the support panel.

4. The work table of claim 1, wherein the slits of each outer beam are disposed proximate the ends of the beam.

5. The work table of claim 1, wherein the slits of the central beam are disposed proximate the center of the beam.

6. The work table of claim 1, further comprising a plurality of compartments disposed at the upper surface of the support panel.

7. The work table of claim 1, further comprising a plurality of separator bars removably coupleable to the upper surface of the support panel.

* * * * *